T. J. GAYNOR.
Animal Trap.
No. 208,386.  Patented Sept. 24, 1878.
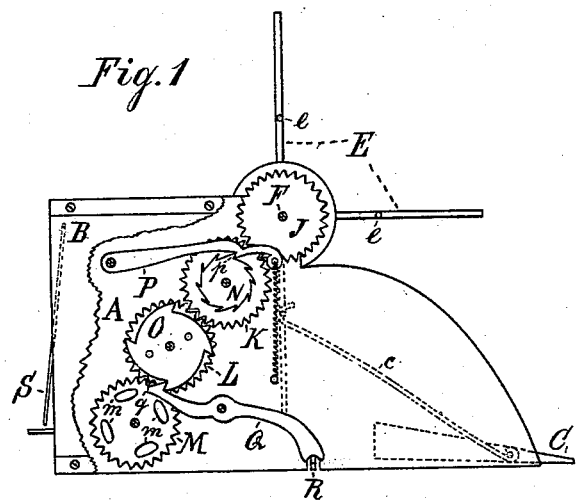
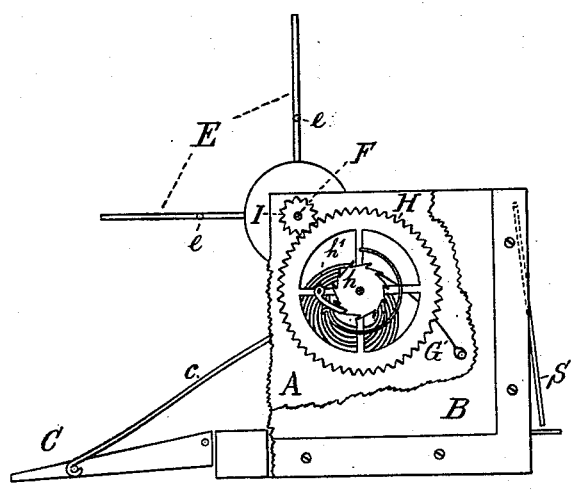
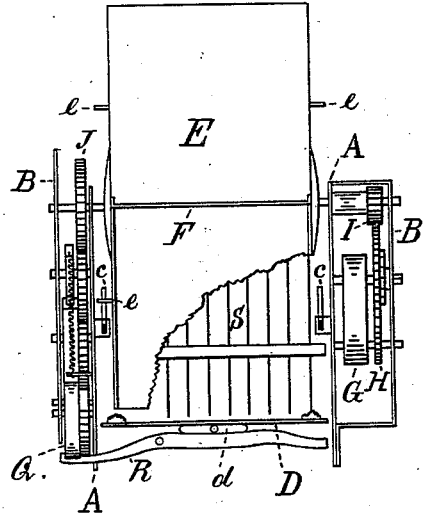
WITNESSES.
James B. Lizius
Wm J. Millner
INVENTOR.
Timothy J. Gaynor,
C. Bradford
ATTORNEY.

UNITED STATES PATENT OFFICE

TIMOTHY J. GAYNOR, OF INDIANAPOLIS, INDIANA.

IMPROVEMENT IN ANIMAL-TRAPS.

Specification forming part of Letters Patent No. 208,386, dated September 24, 1878; application filed June 10, 1878.

*To all whom it may concern:*

Be it known that I, TIMOTHY J. GAYNOR, of the city of Indianapolis, county of Marion, and State of Indiana, have invented certain new and useful Improvements in Automatic Traps, of which the following is a specification:

Reference is had to the accompanying drawings, which are made a part hereof, and on which similar letters of reference indicate similar parts.

Figure 1 is a side elevation of my improved trap, showing the mechanism upon the left side of Fig. 3. Fig. 2 is a side elevation, showing the mechanism upon the right side. Fig. 3 is a front elevation with the platform C removed, showing the general arrangement and location of parts. In all these drawings some portions are broken away, so as to give a better view of the construction.

In said drawings the several parts are marked with letters of reference, as specified in the following description:

Those portions marked A are the walls of the trap; those marked B the outer casing, which incloses the mechanism by which trap is operated; C, a platform, upon and across which the rats walk as they enter the trap, and which is so elevated when the trap is sprung as to pitch them forward into it.

D is a plate upon which the bait is secured, and which is so arranged that it operates to spring the trap, when it is either moved down or up, as the rat presses upon or pulls at the bait. E is a revolving door, consisting, preferably, of four wings, by which, when the trap is sprung, the animal is thrown through and beyond into such receptacle as may be provided. F is the shaft on which the revolving door turns. The mechanism is so arranged as to allow this shaft to turn just one-fourth around each time the trap is sprung, and consequently to bring the wings of the said door successively into use. Each of the wings is provided with studs $e$ $e$, which engage with the upwardly-bent ends of the arms $c$ $c$ of the platform C, and thus pull said platform part way up, so as to pitch the animal forward and prevent his escape each time the trap is sprung. One of said wings also forms a top to the trap, while one of the others forms the door or front.

The shaft F, and through it the other mechanism, is driven by the spring G, operating through the gear-wheel H and pinion I. A ratchet-wheel, $h$, and pawl, $h'$, secures the spring to operate on the wheel H, much in the same way that a similar result is accomplished in ordinary spring-clocks.

Upon the opposite side of the trap is a train of gears, J, K, L, and M, ratchet-wheels N and O, and levers P and Q, by means of which the several movements of the machine are controlled and regulated. In contact with the forward end of the lever Q is the lever R, which is operated by the small lever $d$ on the bait-plate D.

The gears J K L M are all of a size, and consequently move at the same speed.

Upon the same shaft with the gear L is the ratchet O, which is provided with four notches, corresponding to the four arms of the revolving door, and with which the pawl $q$ on the lever Q engages. Below and engaging with the gear L is the gear M, which is provided with the studs $m$ $m$, or a cam-wheel of similar outline, which insures the re-engagement of the pawl $q$ on the lever Q with the ratchet O.

Above the gear L, connecting it with the gear J on the shaft F, is the gear K, on the same shaft with which is the ratchet N, which engages with the pawl $p$ on the lever P, and prevents any reverse movement of any of the parts, either by the pressure of an animal against the inside of the door of the trap or otherwise.

At the rear of the trap may be hung the swinging gate or door S, which opens only outwardly, so that a rat, when forced beyond it, cannot return into the working part of the trap, but will be compelled to remain in the receptacle into which he is thrown.

The operation of my trap may be briefly recapitulated as follows: A rat or other animal, upon approaching the trap, walks upon and across the platform C to the bait-plate or table D. The bait being securely attached to this plate, and the plate itself being loosely mounted upon a central pivot, any effort to obtain the bait must give the ends of the plate an upward or downward movement. The small lever $d$, being rigidly attached to the plate, moves with it and operates the lever R, which, in turn, operates the lever Q and releases the ratchet-wheel O, which allows the gear-wheels to make each a one-fourth revolution, and with them the revolving doors. The latter, upon starting, raises with it the platform C to a sufficient distance to pitch the animal forward, so that he cannot escape the wing of the revolving door which is coming into position, and which throws him violently through and beyond it and into such a receptacle as may be provided for holding him. At about the time the door strikes the rat the arms $c\ c$ and studs $e\ e$ become disengaged, and the platform falls back into its ordinary position. At the same time the pawl $q$ engages with the next notch of the ratchet-wheel O, and the trap is again ready for action. The sides of trap come far enough forward to inclose the platform, so as to prevent the escape of the rat by running sidewise.

To the rear end of my trap I have contemplated attaching a cage as a receptacle for the rats when caught, and thus securing them until they can be removed and killed. A barrel or tub of water may also be arranged so that they will fall into it and be drowned.

The means of exit from the working part of the trap may be either the swinging gate shown in the drawings, or a tripping-bottom, or such other means as may be thought best to secure their speedy removal.

The object of my invention is to provide an automatically acting and setting trap, which shall be capable of catching a large number of rats or other similar animals without any further attention on the part of the operator than to once wind it and place it in position, and also to so construct it that it will operate to throw them from itself, when caught, into a separate inclosure, and thus keep the trap free from any smell which would operate to deter others from entering it. These objects the trap hereinbefore described accomplishes in a perfectly satisfactory manner.

Having thus fully described my said invention, what I claim as new, and desire to secure by Letters Patent, is—

1. In an animal-trap, the combination of the revolving door E, shaft F, gear-wheels J K L, ratchet-wheel O, and pawl-lever Q, substantially as herein shown and specified.

2. The combination of the centrally-pivoted bait-plate D, small lever $d$, lever R, lever Q, and ratchet-wheel O, substantially as herein shown and specified.

3. The combination of the wings of the revolving door, having studs $e\ e$, with the arms $c\ c$ of the platform C, said arms being provided with upwardly-projecting ends, against which said studs strike as the door revolves, thus operating to raise said platform part way and then release it, substantially as herein shown and specified.

In witness whereof I have hereunto set my hand and seal at Indianapolis, Indiana, this 7th day of June, A. D. 1878.

TIMOTHY J. GAYNOR. [L. S.]

In presence of—
C. BRADFORD,
WM. J. MILLNER.